United States Patent [19]
Huber et al.

[11] Patent Number: 6,122,638
[45] Date of Patent: *Sep. 19, 2000

[54] OBJECT-ORIENTED PROCESSOR AND METHOD FOR CACHING INTERMEDIATE DATA IN AN OBJECT-ORIENTED PROCESSOR

[75] Inventors: Gary Douglas Huber; Donald William McCauley, both of Austin, Tex.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/979,597

[22] Filed: Nov. 26, 1997

[51] Int. Cl.[7] .................................................. G06F 17/30
[52] U.S. Cl. .......................... 707/103; 709/303; 711/103
[58] Field of Search ................................. 395/707, 709, 395/380, 705, 385, 702, 704; 707/103; 711/103; 709/303, 301, 201, 202

[56] References Cited

U.S. PATENT DOCUMENTS

| | | | |
|---|---|---|---|
| 5,386,568 | 1/1995 | Wold et al. ............................ | 364/221 |
| 5,499,369 | 3/1996 | Atkinson ............................... | 709/300 |
| 5,560,013 | 9/1996 | Scalzi et al. ........................... | 395/705 |
| 5,774,721 | 6/1998 | Robinson .............................. | 709/303 |
| 5,802,373 | 9/1998 | Yates et al. ............................ | 395/705 |
| 5,819,056 | 10/1998 | Favor .................................... | 395/380 |
| 5,835,951 | 11/1998 | McMahan ............................. | 711/145 |
| 5,842,017 | 11/1998 | Hookway et al. ..................... | 395/707 |
| 5,848,274 | 12/1998 | Hamby et al. ........................ | 395/705 |
| 5,870,575 | 2/1999 | Kahle et al. .......................... | 395/385 |
| 5,913,064 | 6/1999 | Chen ..................................... | 707/103 |

OTHER PUBLICATIONS

Sun Microsystems, Inc., "Picojava I Microprocessor Core Architecture," 1997; pp. 1–9.
Sun Microsystems, Inc., Microprocessor Forum, "Micro-Java 701: A Java–Centric Processor," 1997, pp. 1–9.

*Primary Examiner*—Wayne Amsbury
*Assistant Examiner*—Thu-Thao Havan
*Attorney, Agent, or Firm*—Casimer K. Salys; Brian F. Russell; Andrew J. Dillon

[57] ABSTRACT

An object-oriented processor and method of operating such a processor are disclosed. According to the method, in response to receiving a first instruction that references a first object having both data and at least a first method associated therewith, an address of the first method is calculated. In addition, at least one pointer is cached that indicates (possibly together with other pointers) the address of the first method. In response to receipt of a subsequent second instruction that references a second object having both data and one or more methods associated therewith, where the one or more methods include the first method, the address of a second method associated with the second object is determined by reference to the cached pointer. In a preferred embodiment of the present invention, the first and second methods comprise the same method, and the cached pointer indicates the entry point of that single method.

21 Claims, 5 Drawing Sheets

OBJECT-ORIENTED PROCESSOR AND METHOD FOR CACHING INTERMEDIATE DATA IN AN OBJECT-ORIENTED PROCESSOR

BACKGROUND OF THE INVENTION

1. Technical Field

The present invention relates in general to data processing and, in particular, to a method and system for enhancing the performance of an object-oriented processor. Still more particularly, the present invention relates to a method and system for improving the performance of an object-oriented processor by caching intermediate data such as pointer values.

2. Description of the Related Art

Historically, one of the chief obstacles to harnessing the full computing power of computer networks including diverse hardware platforms has been interoperability. Thus, operators of nonhomogeneous networks have had to expend significant resources to be able to port software and permit communication between the diverse hardware platforms within the networks. The need for simple and inexpensive solutions to the problems of intercommunication and software portability has been made even more pressing by the relatively recent popularization and rapid expansion of the Internet and World Wide Web.

In order to address these longstanding problems, programming languages like Java™, which was developed by Sun Microsystems, Inc. of Palo Alto, Calif., have recently gained prominence. Java™ is a compact platform-neutral object-oriented programming language that, when compiled, represents instructions as platform-independent byte codes. These byte codes can be directly executed by a Java-specific processor or can be executed utilizing a software interpreter or a Just-In-Time (JIT) compiler that converts the Java™ byte codes into instructions within the native instruction set of a particular hardware platform.

Referring now to FIG. 1, the data structures of Java™-compliant objects are illustrated. As depicted, Java™-compliant objects can be either of two types: objects with handles or handleless objects. Objects with handles have a objectRef that points to an objectHandle 10, which contains pointers (denoted by asterisks) to each of objectData 12 and methodTable 16. ObjectData 12 includes a length declaration, various flags, and n+1 data words constituting the object's data. Methodtable 16, on the other hand, includes a pointer to an object class descriptor (classBlock 18) and pointers to m+1 methodBlocks 20, which each contain byte codes forming a method that can be executed against all objects within the same class. Thus, all objects within the same class share a common methodTable 16. Information describing the class associated with methodTable 16, including pointers to the className, methodBlock, methodTable, and methodTableSize, are collected within classBlock 18.

As illustrated in FIG. 1, handleless objects are much the same as objects with handles except that handleless objects lack an objectHandle. For handleless objects, the information contained in objectHandle 10 and objectData 12 have been merged into object 14, which includes a length declaration, various flags, and n+1 data words constituting the object's data. In addition, object 14 includes a pointer to an associated methodTable 16 shared by all objects within the same class.

Regardless of whether objects are implemented with handles or as handleless objects, the execution of a Java™ application entails the invocation of specified methods against particular instances of objects. Java™ includes a number of different byte codes for invoking methods (e.g., invokevirtual_quick), each of which is hereinafter referred to as methodInvoke. When a methodInvoke byte code is processed, the objectRef parameter of the methodInvoke is utilized to access either an objectHandle or object, which is in turn accessed to locate the appropriate methodTable for the class including the specified object instance. Finally, the methodTable is accessed to identify the entry point of the method that is to be executed against the specified object instance.

The present invention includes a recognition that methodInvoke is one of the most frequently encountered byte codes in typical Java™ applications. The present invention also includes a recognition that Java™ applications often execute the same method against multiple object instances belonging to the same class. Although all object instances in a given class share a common methodTable, conventional processors redundantly perform the three-level table lookup described above to determine the entry point of each method, despite the fact that the intermediate determination of the location of the methodTable yields the same results for each object instance in the same class.

As should now be apparent, it would be highly advantageous and desirable to provide a mechanism for rapidly mapping method invocations to particular methodBlocks while minimizing the redundant calculation of methodTable entry points.

SUMMARY OF THE INVENTION

It is therefore one object of the present invention to provide an improved method and system for data processing.

It is another object of the present invention to provide a method and system for enhancing the performance of an object-oriented processor.

It is yet another object of the present invention to provide a method and system for improving the performance of an object-oriented processor by caching intermediate data such as pointer values.

The foregoing objects are achieved as is now described. An object-oriented processor and method of operating such a processor are disclosed. According to the method, in response to receiving a first instruction that references a first object having both data and at least a first method associated therewith, an address of the first method is calculated. In addition, at least one pointer is cached that indicates (possibly together with other pointers) the address of the first method. In response to receipt of a subsequent second instruction that references a second object having both data and one or more methods associated therewith, where the one or more methods include the first method, the address of a second method associated with the second object is determined by reference to the cached pointer. In a preferred embodiment of the present invention, the first and second methods comprise the same method, and the cached pointer indicates the entry point of that single method.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
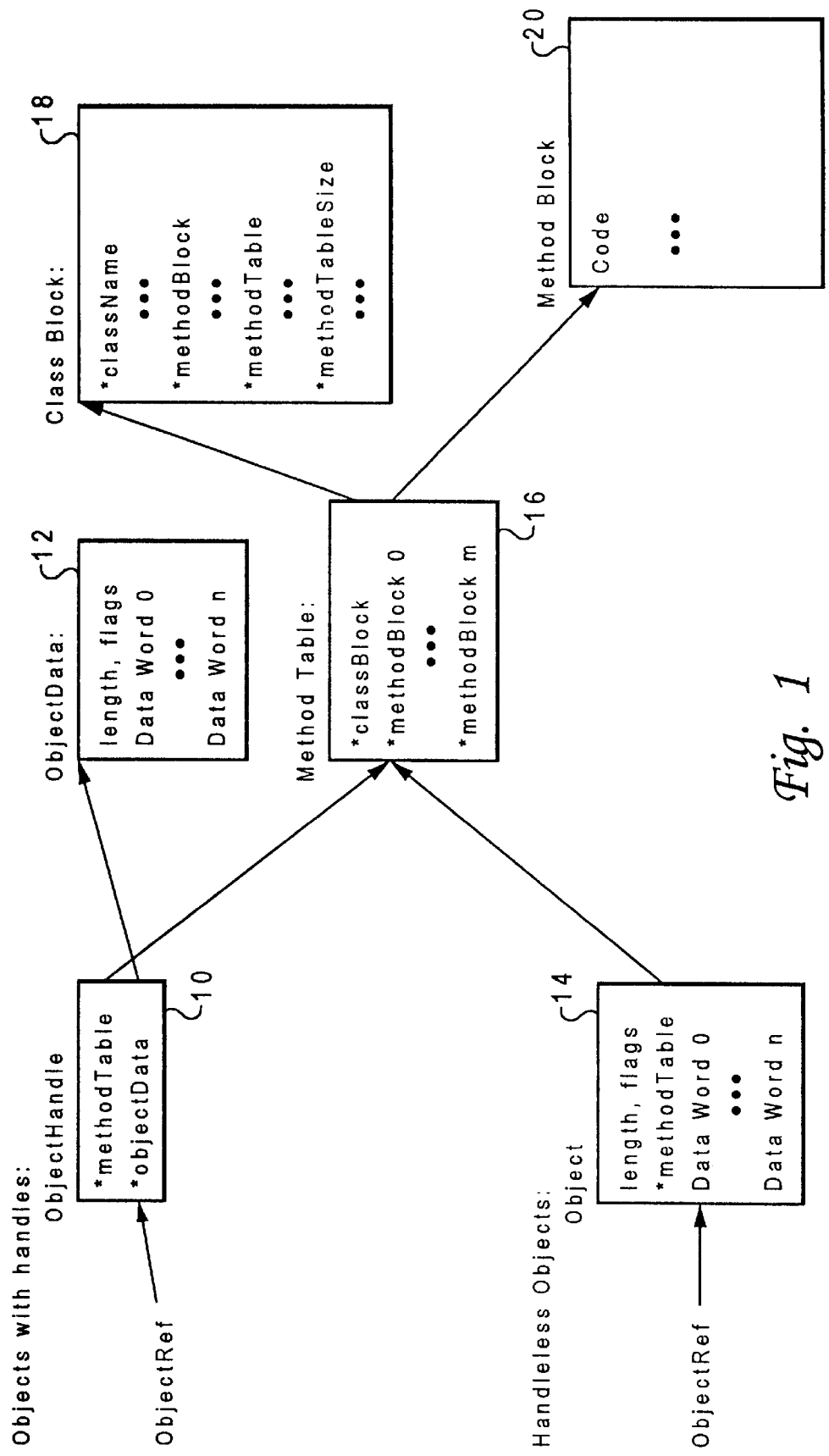
FIG. 1 illustrates the data structures of objects with handles and handleless objects in accordance with the prior art.
Figure 2:
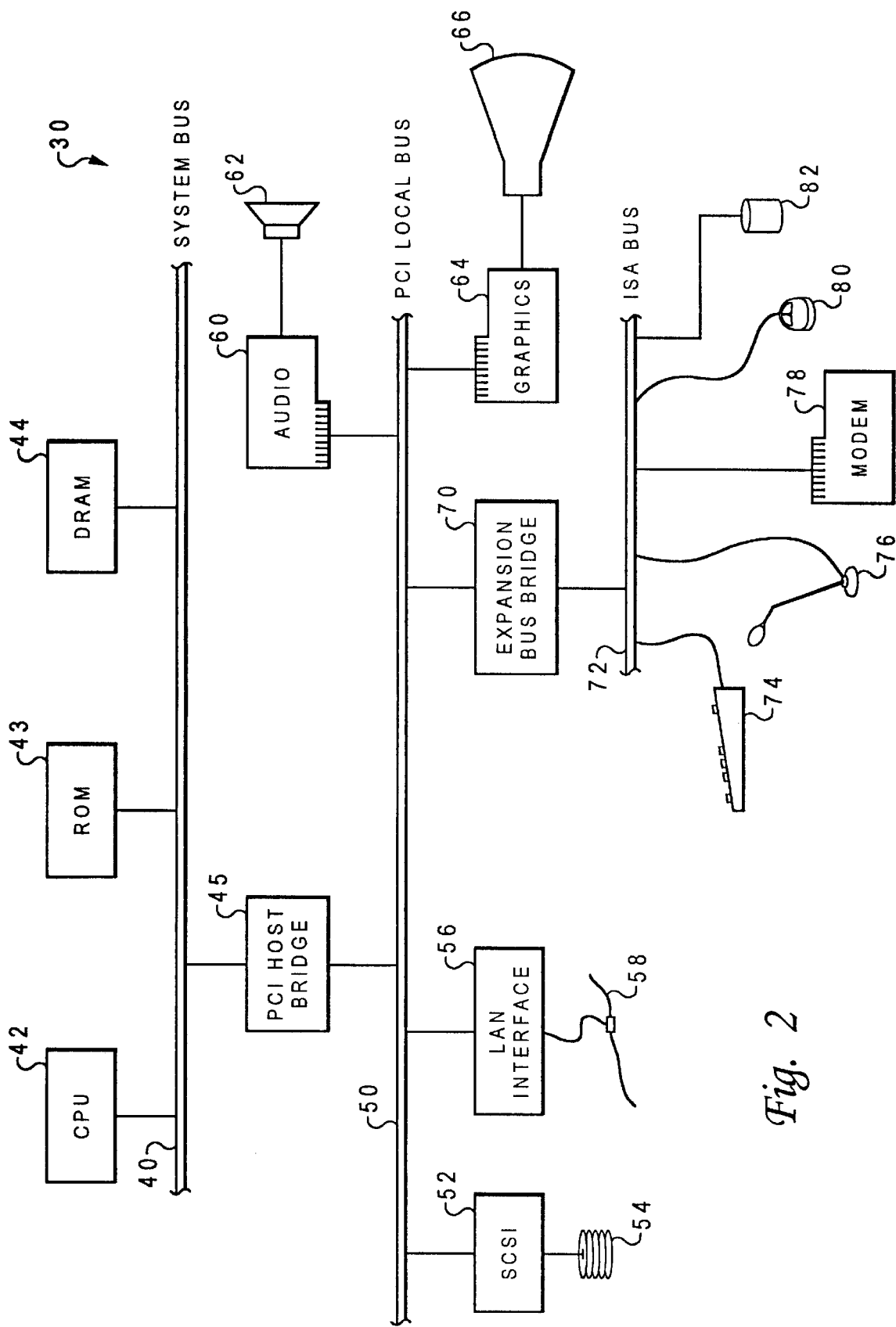
FIG. 2 depicts an illustrative embodiment of a data processing system with which the method and system of the present invention may advantageously be utilized.

With reference again to the figures and in particular with reference to FIG. 2, there is illustrated an exemplary embodiment of a data processing system within which the present invention may advantageously be utilized. In the depicted embodiment, data processing system 30 is a multimedia personal computer system including a system bus 40 connected to a central processing unit (CPU) 42 that executes software instructions and controls the operation of data processing system 30. System bus 40 is also connected to read-only memory (ROM) 43 and dynamic random access memory (DRAM) 44, which provide storage for data and instructions that may be accessed by CPU 42. System bus 40 is further coupled to a Peripheral Component Interconnect (PCI) local bus 50 via PCI host bridge 45. PCI host bridge 45 provides both a low latency path through which CPU 42 may directly access PCI devices mapped to bus memory and/or I/O address spaces and a high bandwidth path through which PCI devices may directly access DRAM 44.

The PCI devices connected to PCI local bus 50 include Small Computer System Interface (SCSI) controller 52, which provides connections for multiple peripherals such as high speed SCSI disk drive 54, and Large Area Network (LAN) interface controller 56, which handles network communication between data processing system 30 and LAN 58. In order to present audio and video data to a user, data processing system 30 is equipped with a PCI-compatible audio controller 60 and graphics controller 64, which drive stereo speakers 62 and video display 66, respectively.

PCI bus 50 is further coupled to an expansion bus, such as ISA bus 72, via expansion bus bridge 70. Coupled to ISA bus 72 are a number of conventional input devices, such as keyboard 74, microphone 76 and mouse 80, as well as other peripherals, such as modem 78 and Integrated Device Electronics (IDE) hard disk 82. Modem 78 can be utilized to establish a connection with the Internet or World Wide Web though a dial-up Internet Service Provider (ISP).

To permit interoperability with diverse hardware platforms and to support software portability, data processing system 30 preferably provides facilities for executing platform-neutral applications (e.g., Java™ applets), which may be stored within the non-volatile storage of data processing system 30 or received by data processing system 30 from LAN 58 or the Internet or World Wide Web. Because software interpreters and JIT compilers for platform-neutral languages like Java™ provide such facilities at the expense of slower performance and/or greater memory consumption, data processing system 30 preferably incorporates the facilities to process platform-neutral instructions within the hardware of CPU 42. Thus, CPU 42 can comprise a Java™-specific processor like the microJava™ 701 produced by Sun Microsystems, Inc., which directly executes Java™ byte codes without interpretation. Alternatively, CPU 42 can incorporate support for Java™ or another platform-neutral language in a processor architecture that supports a different native instruction set architecture (e.g., the PowerPC™ or x86 instruction set architecture).

Figure 3:
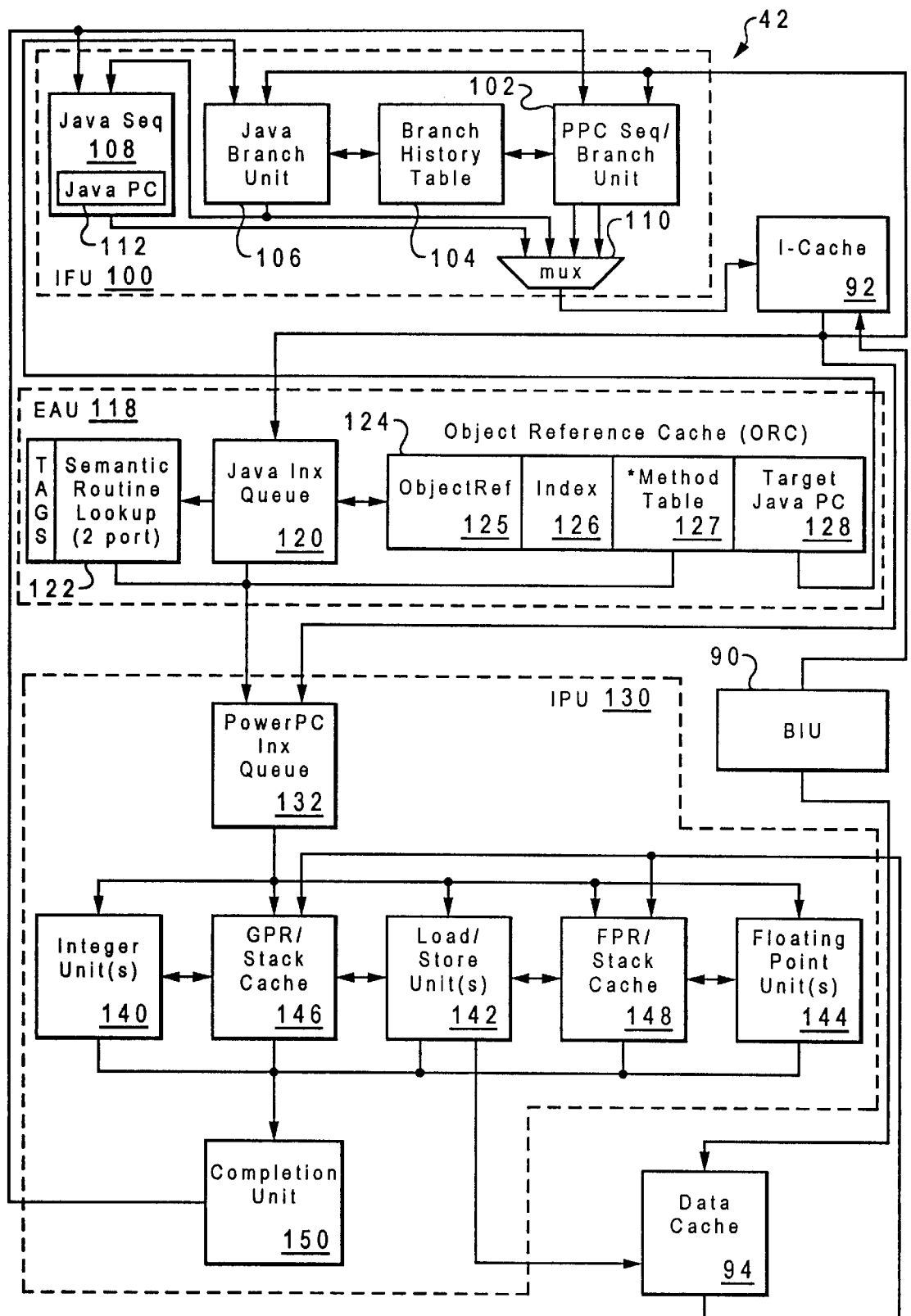
FIG. 3 is a detailed block diagram of the Central Processing Unit (CPU) shown in FIG. 2.

Referring now to FIG. 3, there is depicted a more detailed block diagram of a preferred embodiment of CPU 42 in which hardware emulation support for a platform-neutral language is incorporated within an architecture that directly executes instructions within a different native instruction set. The embodiment of CPU 42 illustrated in FIG. 3 comprises an instance of the PowerPC™ architecture, which is described in a number of publications such as *PowerPC™ 603 RISC Microprocessor User's Manual* and *PowerPC™ 604 RISC Microprocessor User's Manual*, available from IBM Microelectronics as Order Nos. MPR603UMU-01 and MPR604UMU-01, respectively, both incorporated herein by reference. As such, CPU 42 executes native instructions within the PowerPC™ instruction set architecture defined in part by *PowerPC™ User Instruction Set Architecture*. In accordance with the present invention, CPU 42 is also adapted to execute Java™ byte codes by emulation. The Java™ operating environment is described in numerous publications such as *Java™ Virtual Machine Specification*, Addison Wesley Longman, Inc., 1996, which is also incorporated herein by reference.

As an instance of the PowerPC™ architecture, CPU 42 preferably comprises a single integrated circuit superscalar microprocessor, including various registers, buffers, execution units, and functional units that collectively operate according to reduced instruction set computing (RISC) techniques. As shown in FIG. 3, CPU 42 includes a Bus Interface Unit (BIU) 90, which is coupled to system bus 40 and which controls the transfer of instructions and data between CPU 42 and system bus 40. Instructions, including both native instructions and Java™ byte codes, are stored within instruction cache 92, while data is stored in data cache 94. Both instruction cache 92 and data cache 94 are small (e.g., 32 kilobyte) high-speed caches that enable CPU 42 to achieve a relatively fast access time to instructions and data previously transferred from ROM 43 or DRAM 44.

CPU 42 further includes an Instruction Fetch Unit (IFU) 100, which supplies fetch addresses to instruction cache 32, and an Emulation Assist Unit (EAU) 118, which translates byte codes fetched from instruction cache 92 into native instructions. Finally, CPU 42 includes Instruction Processing Unit (IPU) 130, which executes native instructions received from either EAU 118 or directly from instruction cache 92. Of course, CPU 42 includes other conventional circuitry that is not relevant to the present invention and is accordingly omitted for the sake of simplicity.

Still referring to FIG. 3, IFU 100 includes PowerPC™ (PPC) sequencer/branch unit 102, Branch History Table (BHT) 104, Java™ Branch Unit (JBU) 106, Java™ sequencer unit 108, and multiplexer 110. During each cycle, PPC sequencer/branch unit 102 is capable of generating a native sequential address and a native branch target address. Similarly, during each cycle Java™ sequencer unit 108, which maintains a Java™ program counter (PC) 112, is capable of generating an emulation sequential address, and JBU 106 is capable of generating an emulation branch target address. Each of these four potential fetch addresses is input into multiplexer 110, which selects one of the input addresses as a fetch address in response to an unillustrated select signal.

In response to receipt of a fetch address, instruction cache 92 outputs one or more instructions (e.g., an 8 byte cache line) having the fetch address as a base address. As shown in FIG. 3, the set of instructions output by instruction cache 92 are routed to Java™ Instruction Queue (JIQ) 120 if the instructions are byte codes and are routed to PPC instruction queue 132 if the instructions are native instructions. The routing logic can discriminate between instruction types, for example, by reference to a bit in the machine state register (MSR) that indicates whether the current thread is formed of Java™ byte codes or native PowerPC™ instructions. The set of instructions output by instruction cache 92 are also fed back to JBU 106 and PPC sequencer/branch unit 102, which detect whether the set of instructions includes the corresponding type of branch instruction. A detected branch instruction is resolved, if possible, by reference to a count or condition register value, for example. If a detected branch instruction cannot be immediately resolved, the branch is predicted by reference to BHT 104, or in alternative embodiments, by reference to a branch target address cache (BTAC) or branch target cache. The detection of the presence of branch instructions and the resolution or prediction of such branch instructions is then utilized to generate the select signal for multiplexer 110, which determines which of the potential fetch addresses generated by units 102, 106, and 108 is selected as a fetch address.

Figure 4:
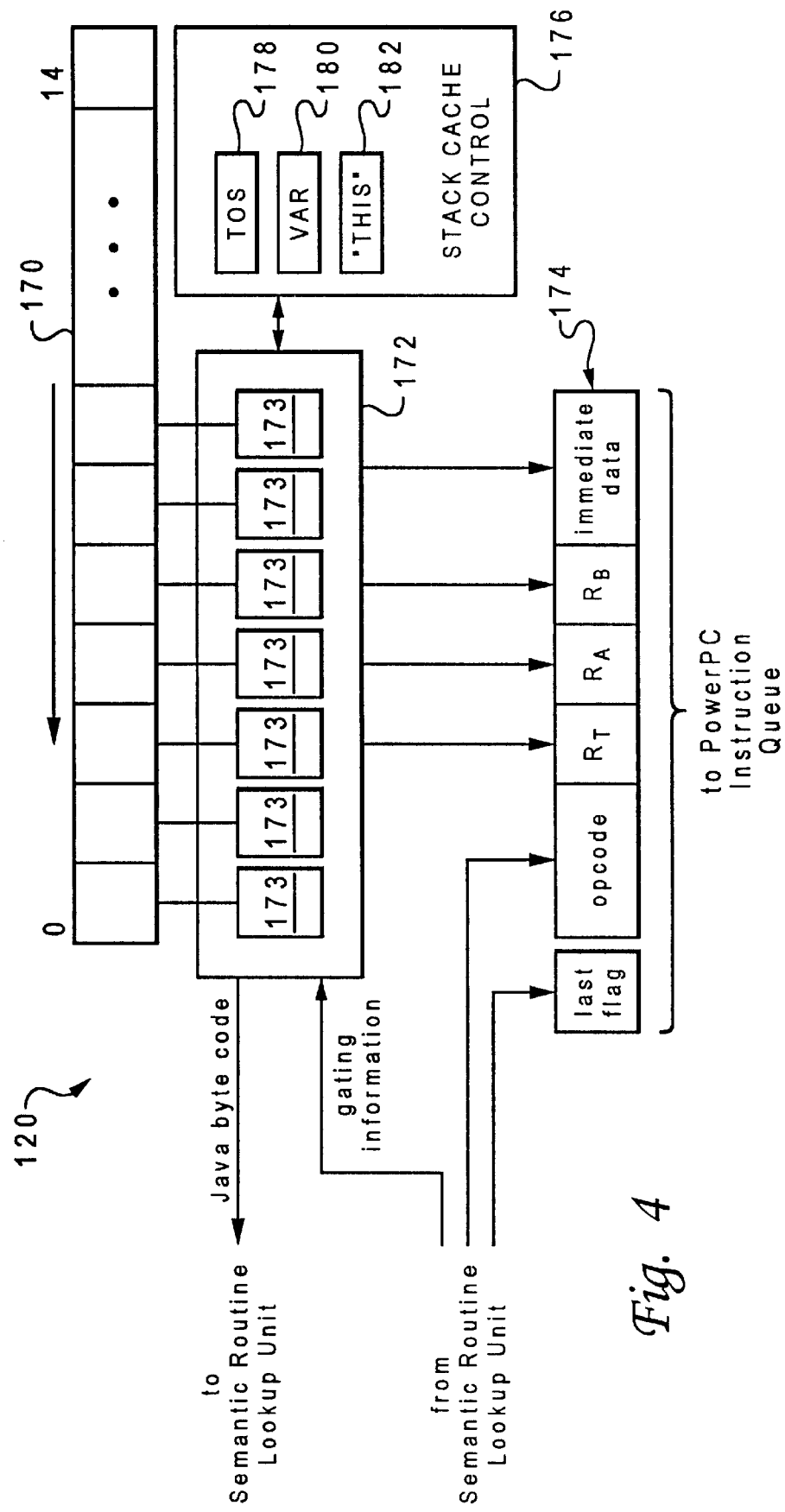
FIG. 4 is a detailed block diagram of the Java™ Instruction Queue (JIQ) of the CPU depicted in FIG. 3.

Referring now to FIG. 4, there is depicted a more detailed block diagram of an illustrative embodiment of JIQ 120. As depicted, JIQ 120 includes a 15-byte shift register 170 that provides storage for 8 or 9 byte codes, assuming an average instruction length of 1.6 to 1.8 bytes. Byte codes fetched from instruction cache 92 are loaded into the least significant bytes of shift register 170 and shifted into the most significant bytes as byte codes are processed and discarded. JIQ 120 further includes decoding and operand logic 172, which contains 7 decoders 173 that decode, in parallel, the byte codes or operands in the 7 most significant bytes of shift register 170. In order to efficiently process decoded byte codes and operands, decoding and operand logic 172 preferably includes idiom detection logic that permits certain byte codes, for example, stack operations, to be grouped together with other byte codes and operands for processing. Consider, for example, the following commonly encountered series of byte codes, which can be processed as an idiom:

iload_1
 iload_2
 iadd
 istore_3

This series of byte codes loads local variables 1 and 2, which are integers, to the top of the stack of the current thread, adds the local variables together, and stores the resulting integer back to the top of the stack as local variable 3. Because the underlying PowerPC™ architecture of CPU 42 does not have a stack per se, but instead maps the Java™ Virtual Machine (JVM) stack cache to General Purpose Registers 146 and Floating Point Registers 148 (as shown in FIG. 3), the idiom detection logic can effectively discard the load and store instructions, which translate to PowerPC™ register manipulations, and isolate the iadd as the only byte code in the idiom that requires translation to a native instruction.

Figure 5:
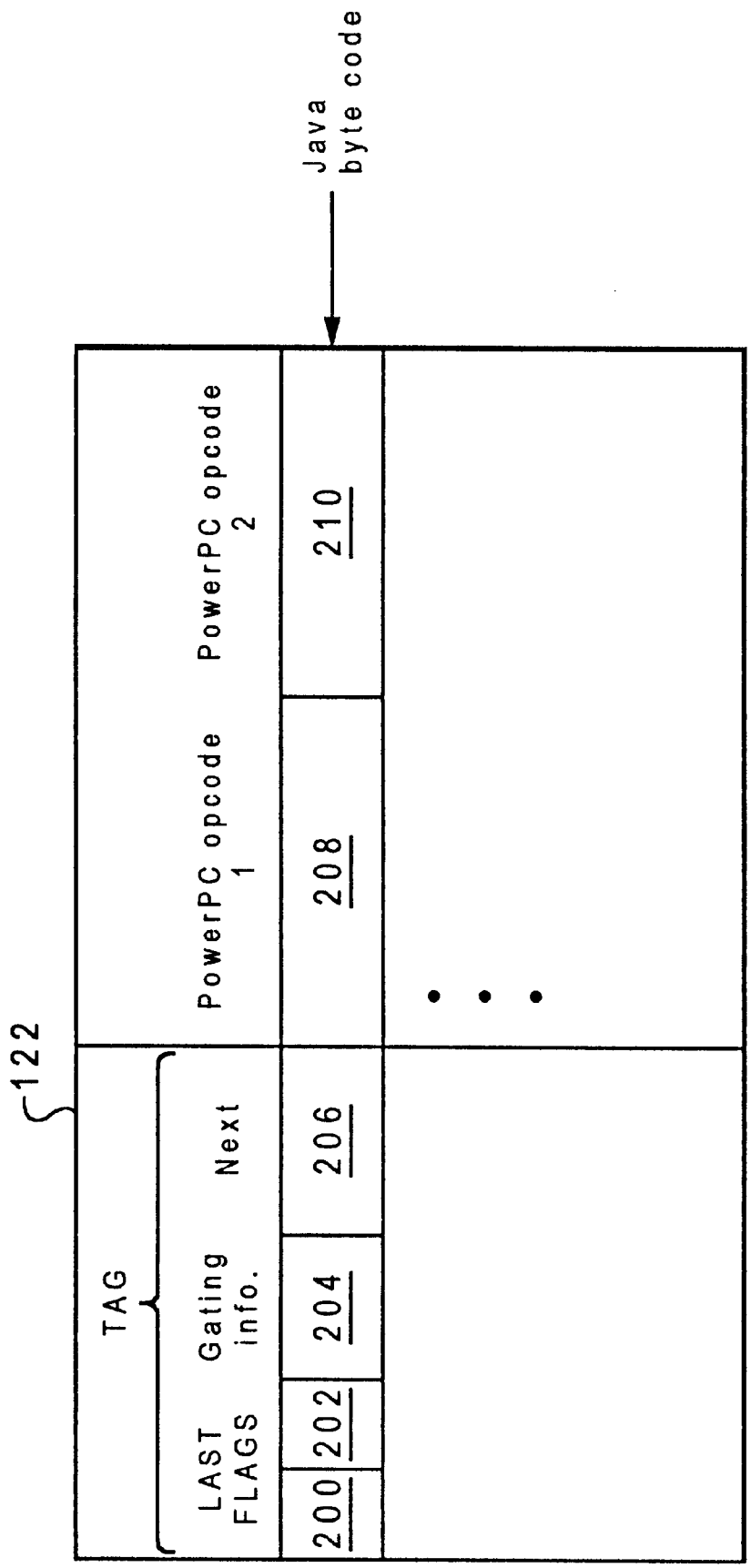
FIG. 5 is a detailed block diagram of the Semantic Routine Lookup Unit (SRLU) of the CPU illustrated in FIG. 3.

Referring again to FIG. 3, each byte code isolated by the idiom detection logic of JIQ 120 is passed to Semantic Routine Lookup Unit (SRLU) 122, which maps the byte code to a corresponding semantic routine formed of one or more native PowerPC™ instructions. As illustrated in FIG. 5, SRLU 122 is preferably implemented as an array containing a plurality of entries that each include two opcode fields 208 and 210 for storing semantic routine opcodes and two last flag fields 200 and 202, which each indicate whether the corresponding one of opcode fields 208 and 210 contains the last opcode in the semantic routine. Each entry in SRLU 122 further includes a gating information field 204, which stores information indicating how native instruction operands are to be obtained, and a next field 206 for storing a pointer, if necessary, to another entry containing additional opcodes within the semantic routine. Because there is a maximum of 256 byte codes and because most byte codes map to a single native instruction, SRLU 122 can map a substantial majority of the Java™ instruction set to the native PowerPC™ instruction set utilizing approximately 1 K entries. (A small number of byte codes that are emulated using a relatively large number of native instructions may branch to native routines not stored in SRLU 122.) Of course, in embodiments emulating larger instruction sets, SRLU can be implemented as a dynamically loaded set associative cache. In response to receiving a Java™ byte code from JIQ 120, SRLU 122 utilizes the byte code as an 8-bit index to select an entry in the array. The contents of fields 200, 202, 204, 208 and 210 within the selected entry are returned to JIQ 120, while next field 206 is utilized to select an additional entry that stores opcodes in the semantic routine, if any. In this manner, all opcodes in the semantic routine to which a byte code maps are returned to JIQ 120.

Referring again to FIG. 4, JIQ 120 further includes one or more native instruction buffers 174, which are utilized to construct native instructions by matching native opcodes returned from SRLU 122 with appropriate operands. Thus, as illustrated in FIG. 4, an opcode and last flag are loaded into instruction buffer 174 upon receipt from SRLU 122, while the target register ($R_T$) I source registers ($R_A$ and $R_B$), and the immediate data, if any, of the native instruction are provided by decoding and operand logic 172 in response to the gating information provided by SRLU 122. In this manner, decoding and operand logic 172 can determine whether the operands of a native instruction include immediate data stored in one or more of the bytes of shift register 170 and/or stack data stored in GPRs 146 or FPRs 148. Decoding and operand logic 172 is coupled to stack cache control 176, which maintains a plurality of pointers (including top of stack (TOS) pointer 178) that record the stack cache ordering of GPRs 146 and FPRs 148. In addition, stack cache control 176 maintains one or more VAR pointers 180 that indicate the location(s) of a method's local variables in the stack cache. By accessing these pointers, decoding and operand logic 172 can easily map a stack entry specified as an operand source or result register to one of GPRs 146 and FPRs 148. Once a native instruction has been constructed in native instruction buffer 174, the native instruction is transferred to conventional PPC instruction queue 132 within IPU 130.

As discussed supra, methodInvoke is one of the most frequently encountered Java™ byte codes. In accordance with the present invention, CPU 42 is therefore equipped with an Object Reference Cache (ORC) 124 to accelerate the processing of methodInvoke byte codes. ORC 124 contains a plurality of entries, which, as illustrated in FIG. 3, each include an objectRef field 125, a methodtable pointer field 127 for indicating the predicted methodTable for a particular Java™ PC, an index field 126 for specifying a particular method in the predicted methodTable, and a target Java™ PC field 128 for specifying the entry point of the method indicated by index field 126. In operation, when a methodInvoke byte code is encountered in the Java™ instruction stream, the methodInvoke is preceded by a load instruction that loads the objectRef of the object against which the method is to be executed to the top of the stack. Because methods are frequently executed against the current object (i.e., "this"), stack cache control 176 maintains "this" pointer 182, which indicates the location in the stack of the objectRef of "this." The methodInvoke byte code is followed in the Java™ instruction stream by an index that indicates which methodTable pointer specifies the method to be executed. In parallel with the access to SRLU 122 triggered by the decoding of a methodInvoke byte code, some or all of the bits of the Java™ PC associated with the methodInvoke byte code are utilized to select one or more entries in ORC 124. Depending on the implementation, the initially selected entries can then be qualified by additional Java™ PC bits or with the contents of index field 126 (and optionally with the contents of objectRef field 125). If no matching entry is found in ORC 124 (i.e., a miss occurs), the methodTable pointer and target Java™ PC for the methodInvoke are calculated in the manner described below, and a new entry containing this information is stored within ORC 124. If, however, a matching entry is found (i.e., a hit occurs), the target Java™ PC is passed to JBU 106, through multiplexer 110, and then to instruction cache 92 as a speculative fetch address. As discussed above, instruction cache 92 responds to the speculative fetch address by outputting byte codes in the method to JIQ 120.

To verify the methodTable and method entry point predictions recorded in ORC 124 (or to calculate the methodTable pointer and method entry point if the Java™ PC missed in ORC 124), the methodInvoke semantic routine preferably includes a native load instruction that loads the correct methodTable pointer from the JVM heap, which resides in data cache 94 and DRAM 44. In order to determine the heap address of the correct methodTable pointer, decoding and operand logic 172 subtracts 4 from the objectRef operand of the load byte code preceding the methodInvoke byte code. This subtraction is performed because the objectRef points to the objectData pointer (if the object has handles) or to the first word of object data (if the object is handleless) and the methodTable pointer is 4 bytes long. The methodTable pointer at the resulting heap address is then loaded from data cache 94 and compared to the predicted methodTable pointer stored in ORC 124, preferably utilizing a native trap instruction. If the methodTable pointers match, the prediction is verified, and no trap is taken. However, in the event that the predicted and correct methodTable pointer differ, the trap instruction traps to a recovery routine that cancels the mispredicted instructions from the Java™ and PPC instruction streams and resets Java™ PC 112 to the entry point of the correct method, which entry point is loaded from the methodTable utilizing the index that follows the methodInvoke byte code. The recovery routine also updates ORC 124 by storing the objectRef, methodTable pointer, index, and method entry point of the correct method in the entry associated with the Java™ PC of the methodInvoke byte code.

Referring now to IPU 130 of FIG. 3, semantic routine native instructions and native instructions fetched directly from instruction cache 92 are loaded into PPC instruction queue 132. Decoding logic within PPC instruction queue 132 detects and folds out any branch instructions within the native instruction stream, leaving only sequential instructions. The native sequential instructions stored within PPC instruction queue 132 are opportunistically dispatched to the sequential instruction execution circuitry of CPU 42 as execution resources become available.

In the depicted illustrative embodiment, the sequential instruction execution circuitry of CPU 42 includes three types of execution units, namely, integer unit(s) (IUs) 140, load/store unit(s) (LSUs) 142, and floating-point unit(s) (FPUs) 144. Each of these three types of execution units can execute one or more classes of native instructions, and all execution units can operate concurrently during each processor cycle. For example, IUs 140 perform fixed-point mathematical operations such as addition, subtraction, ANDing, ORing, and XORing, utilizing source operands received from specified general purpose registers (GPRs) 146 (or from unillustrated GPR rename buffers within GPRs 146). Following the execution of fixed-point instructions, IUs 140 output the data results of the instructions to the GPR rename buffers, which provide temporary storage for the data results until the data results are written to at least one of the GPRs 146 during the writeback stage of instruction processing. Similarly, FPUs 144 perform floating-point operations, such as floating-point multiplication and division, on source operands received from floating-point registers (FPRs) 148 (or unillustrated FPR rename buffers within FPRs 148). FPUs 144 output data resulting from the execution of floating-point instructions to selected FPR rename buffers, which temporarily store the data results until the data results are written to selected FPRs 144 during the writeback stage of instruction processing. As the name implies, LSUs 142 execute floating-point and fixed-point instructions that either load data from memory (i.e., either data cache 94 or main memory DRAM 44) into selected GPRs 146 or FPRs 148 or that store data from a selected one of GPRs 146, the GPR rename buffers, FPRs 148, and the FPR rename buffers to memory.

CPU 42 employs both pipelining and out-of-order execution of instructions to further improve the performance of its superscalar architecture. Accordingly, multiple instructions can be simultaneously executed by PPC sequencer/branch unit 102, IUs 140, LSUs 142, and FPUs 144 in any order as long as data dependencies and antidependencies are observed between sequential instructions. In addition, instructions are processed by each of IUs 140, LSUs 142, and FPUs 144 at a sequence of pipeline stages, including fetch, decode/dispatch, execute, finish and completion/writeback. Those skilled in the art should appreciate, however, that some pipeline stages can be reduced or combined in certain design implementations.

During the fetch stage, PPC sequencer/branch unit 102 causes instruction cache 92 to output one or more instructions associated with one or more memory addresses from instruction cache 92. As noted above, sequential instructions fetched from instruction cache 92 are stored within PPC instruction queue 132, while native branch instructions are folded out and forwarded to the branch processing circuitry of PPC sequencer/branch unit 102 for execution.

During the decode/dispatch stage, dispatch logic associated with PPC instruction queue 132 decodes one or more native instructions and dispatches the instructions to an appropriate one of sequential instruction execution units 140, 142, and 144 as dispatch-dependent execution resources become available. These execution resources, which are allocated by the dispatch logic, can include a rename buffer within the GPR or FPR rename buffers and a completion buffer entry in completion unit 150.

During the execute stage, execution units 140, 142, and 144 execute native instructions received from PPC instruction queue 132 opportunistically as operands and execution resources for the indicated operations become available. In order to minimize dispatch stalls, each one of the execution units 140, 142, and 144 is preferably equipped with a reservation station that stores dispatched instructions for which operands or execution resources are unavailable.

After the operation indicated by a native instruction has been performed, the data results of the operation are stored by execution units 140, 142, and 144 within either the GPR or FPR rename buffers, depending upon the instruction type. Then, execution units 140, 142, and 144 signal completion unit 150 that the execution unit has finished an instruction. In response to receipt of a finish signal, completion unit 150 marks the completion buffer entry of the instruction specified by the finish signal as complete. Instructions marked as complete thereafter enter the writeback stage, in which instructions results are written to the architected state by transferring the data results from the rename buffers to GPRs 146 or FPRs 148. In order to support precise exception handling, native instructions are written back in program order. As illustrated, completion unit 150 is further coupled to Java™ sequencer 108 and PPC sequencer/branch unit 102. Upon completion of a native instruction, completion unit 150 signals PPC sequencer/branch unit 102 to update the architected PPC program counter and, if the native instruction has its associated last flag set, signals Java™ sequencer 108 to update Java™ PC 112.

As has been described, the present invention improves the performance of an object-oriented processor by caching intermediate data, such as methodTable pointers and method entry points, thereby permitting instructions within a method to be fetched for execution without again calculating the intermediate data. In implementations that permit speculative execution, early prediction of a method entry point utilizing cached intermediate data allows instructions in the method to be fetched prior to verification of the entry point, consequently eliminating instruction fetch latency in cases in which the prediction is subsequently verified. The present invention is of particular utility in architectures that execute methods by emulation in that the performance advantage achieved by the present invention ameliorates the performance degradation often associated with emulation.

While the invention has been particularly shown and described with reference to a preferred embodiment, it will be understood by those skilled in the art that various changes in form and detail may be made therein without departing from the spirit and scope of the invention. For example, it should be understood that although the present invention has been described with reference to an illustrative embodiment that emulates the execution of byte codes, the present invention is also applicable to other processor architectures, including those which directly execute byte codes or other platform-neutral instructions. In addition, while the disclosed embodiment implements the ORC access during the Java™ dispatch cycle, the present invention contemplates that the ORC access could alternatively be implemented during the instruction cache access cycle.

What is claimed is:

1. A method of operating a processor, said method comprising:

in response to receiving a first instruction that references a first object having both data and at least a first method associated therewith, calculating an address of said first method and caching at least one pointer among one or more pointers that collectively indicate said address of said first method, wherein said step of caching at least one pointer comprises the step of caching a table pointer indicating an address in memory of a table containing pointers to an entry point of said first method and an entry point of a different second method; and in response to receipt of a subsequent second instruction that references a different second object having both data and one or more methods associated therewith, said one or more methods including said first and said second methods, determining an address of said second method by reference to said table pointer.

2. The method of claim 1, wherein said second instruction invokes execution of said second method against said second object.

3. The method of claim 1, wherein said first and second methods are the same method, and step of caching at least one pointer further comprises the step of caching an entry point of said first method.

4. The method of claim 1, said step of caching at least one pointer further comprising the step of caching an index specifying a location, within said table, of said pointer to said entry point of said first method.

5. The method of claim 1, and further comprising the steps of:

thereafter, speculatively fetching at least one instruction at said determined address of said second method for execution;

determining whether said determined address of said second method is correct; and in response to a determination that said determined address of said second method is incorrect, discarding said at least one speculatively fetched instruction.

6. The method of claim 5, and further comprising the step of executing said at least one speculatively fetched instruction by emulation.

7. The method of claim 6, wherein:

said step of executing said at least one speculatively fetched instruction by emulation comprises the step of executing a semantic routine formed of one or more native opcodes in an instruction set native to said processor; and said step of determining whether said determined address of said second method is correct comprises executing one or more native instructions formed from native opcodes within said semantic routine.

8. The method of claim 1, said determining step further comprising the step of accessing said at least one cached pointer utilizing a program counter of said second instruction.

9. The method of claim 1, and further comprising:

storing a semantic routine formed of one or more native opcodes in a native instruction set of said processor;

fetching at least one non-native instruction at said determined address of said second method; and in response to fetching said at least one non-native instruction, loading said semantic routine and executing at least one native instruction formed utilizing a native opcode within said semantic routine, such that execution of said non-native instruction is emulated.

10. The method of claim 9, and further comprising:

storing, in association with said semantic routine, gating information indicating a location of an operand of a particular native opcode in said semantic routine; and in response to receipt of said non-native instruction, supplying said operand for said particular native opcode utilizing said indication of said location, wherein said particular native opcode and said operand together form a native instruction.

11. A processor, comprising:

one or more execution units;

an object reference cache including an entry that stores at least one pointer among one or more pointers that collectively indicate an address of a first method that, together with specified data, is associated with a first object, wherein said least one pointer includes a table pointer indicating a location of a table containing pointers to an entry point of said first method and an entry point of a different second method; and decoding logic, coupled to said object reference cache, that in response to receipt of an instruction referencing a different second object having both one or more methods and specified data associated therewith, said one or more methods including both said first and second methods, determines an address of said second method by reference to said table pointer in said object reference cache.

12. The processor of claim 11, wherein said instruction invokes execution of said second method against said second object.

13. The processor of claim 11, said at least one pointer including a pointer indicating an entry point of said first method.

14. The processor of claim 11, said entry further storing an index specifying a location, within said table, of said pointer to said entry point of said first method.

15. The processor of claim 11, wherein said processor has an associated memory, said processor further comprising:

an instruction fetch unit, coupled to receive said determined address of said second method, that speculatively fetches at least one instruction at said determined address of said second method from said memory;

means for determining whether said determined address of said second method is correct; and means, responsive to a determination that said determined address of said second method is incorrect, for discarding said at least one speculatively fetched instruction.

16. The processor of claim 15, wherein:

said one or more execution units execute instructions in a native instruction set;

said processor includes means for translating said at least one speculatively fetched instruction into a semantic routine formed of one or more native opcodes in said native instruction set, such that said at least one speculatively fetched instruction can be executed by emulation, wherein said semantic routine includes one or more native opcodes that when executed determine whether said determined address of said second method is correct.

17. The processor of claim 11, wherein said second instruction has a program counter associated therewith that said decoding logic utilizes to access said at least one cached pointer in said object reference cache.

18. The processor of claim 11, and further comprising:

a semantic routine lookup unit that stores a semantic routine formed of one or more native opcodes in a native instruction set of said processor, wherein responsive to receipt of a non-native instruction at said determined address of said second method, said semantic routine lookup unit outputs said semantic routine; and means, responsive to receipt of a native opcode within said semantic routine, for forming at least one native instruction and passing said at least one native instruction to said one or more execution units for execution, such that execution of said non-native instruction is emulated.

19. The processor of claim 18, wherein:

said semantic routine lookup unit stores, in association with said semantic routine, gating information indicating a location of an operand of a particular native opcode in said semantic routine; and said processor further comprises means for supplying said operand for said particular native opcode utilizing said indication of said location, wherein said particular native opcode and said operand together form a native instruction.

20. A method of emulating execution of a non-native instruction in a processor that executes native instructions in a native instruction set, each of said native instructions having a native opcode, said method comprising:

storing a semantic routine including one or more native opcodes for emulating execution of a non-native instruction;

storing gating information indicating a location of an operand of a particular native opcode in said semantic routine;

in response to receipt of said non-native instruction, loading said semantic routine and supplying said operand for said particular native opcode utilizing said indication of said location, wherein said particular native opcode and said operand together form a native instruction; and executing native instructions formed from native opcodes in said semantic routine, such that execution of said non-native instruction is emulated.

21. A processor that executes native instructions in a native instruction set and emulates execution of non-native instructions, wherein each of said native instructions has a native opcode, said processor comprising:

means for storing a semantic routine including one or more native opcodes that emulate execution of a non-native instruction;

means for storing gating information indicating a location of an operand of a particular native opcode in said semantic routine;

means, responsive to receipt of said non-native instruction, for loading said semantic routine and supplying said operand for said particular native opcode utilizing said indication of said location, wherein said particular native opcode and said operand together form a native instruction; and means for executing native instructions formed from native opcodes in said semantic routine, such that execution of said non-native instruction is emulated.

* * * * *